United States Patent [19]
Lühmann et al.

[11] Patent Number: 5,539,018
[45] Date of Patent: Jul. 23, 1996

[54] POLYMER DISPERSION

[75] Inventors: Erhard Lühmann, Bomlitz; Lutz Hoppe, Walsrode; Wolfgang Dannhorn, Walsrode; Hans-Jürgen Juhl, Walsrode, all of Germany

[73] Assignee: Wolff Walsrode Aktiengesellschaft, Walsrode, Germany

[21] Appl. No.: 386,791

[22] Filed: Feb. 10, 1995

[30] Foreign Application Priority Data

Feb. 18, 1994 [DE] Germany .............................. 44 05 208.1

[51] Int. Cl.$^6$ ......................................................... C08L 51/00
[52] U.S. Cl. .................. 523/201; 524/504; 524/507; 524/804; 524/833; 525/454; 525/455
[58] Field of Search ............................ 523/201; 524/504, 524/507, 804, 833; 525/454, 455

[56] References Cited

U.S. PATENT DOCUMENTS 5,225,456  7/1993  Langerbeins ............................ 523/201
5,334,420  8/1994  Hartung et al. .
5,405,879  4/1995  Uemae .................................... 523/201

FOREIGN PATENT DOCUMENTS 9115528  10/1991  WIPO .

*Primary Examiner*—Patricia A. Short
*Attorney, Agent, or Firm*—Sprung Horn Kramer & Woods

[57] ABSTRACT

The present Application relates to a polymer dispersion comprising an aqueous continuous phase and dispersed particles, which consist of a polymerized, water-soluble, urethane-modified allyl ether polyester and polymerized monomers, wherein at least two polymerized monomers A and B together with a water-soluble urethane-modified allyl ether polyester constitute the dispersion particle and are produced according to the core-shell model (multiphase).

5 Claims, No Drawings

POLYMER DISPERSION

This invention relates to polymer dispersions which can be crosslinked by means of polyisocyanates, and to their applications and their preparation.

In the field of coatings and their applications technologies, environmental assessment, particularly the reduction of solvent emissions, plays an essential role.

The problem of solvent emissions can be solved by the use of aqueous systems. Aqueous systems may be poly(meth)acrylate dispersions, for example.

Film formation with these dispersions takes place purely physically, but the mechanical and chemical durability do not correspond to those of conventional, solvent-containing binder systems.

If chemical crosslinking of the binder is effected at temperatures of < 70° C., these dispersions can generally be reacted with crosslinking agents based on aziridine, but this class of materials is carcinogenic and is thus ruled out for the responsible manufacturer.

EP 03 58 979 describes combinations of aqueous polyhydroxy polyacrylates and polyisocyanates for the production of high-grade coating systems.

The polyhydroxy polyacrylates described therein are produced by solution polymerisation, e.g. in butyl acetate. After polymerisation the carboxyl and sulphonic acid groups are neutralized with alkalies and diluted with water. After a very costly solvent distillation step, aqueous solutions and/or dispersions are obtained, depending on the structure of the polymer.

If the binder system exists as an aqueous solution, its inherent viscosity is relatively high and the adjustment of solids-rich binder systems is therefore only possible to a very limited extent.

However, it is advantageous that the OH groups, which are randomly distributed in the polymer, are relatively easily accessible to the isocyanate groups and are thus accessible for crosslinking. However it is disadvantageous that a significant increase in viscosity occurs in a relatively short period after the isocyanate addition, and adjustment of the application parameters becomes difficult.

If the vehicle system exists as a dispersion, the inherent viscosity of the lacquer system is considerably reduced, and solids-rich lacquer systems are adjustable. Since however the OH groups are uniformly distributed in the polymer particles and subsequent isocyanate crosslinking mainly occurs at the dispersion particle interface with the OH groups, complete OH crosslinking is barely achieved in the dispersion particles.

This crosslinking deficit reduces the mechanical and chemical durability to an unacceptably low level.

DE-OS 39 02 555 describes acrylate dispersions which are produced according to the core-shell model (multiphase).

Only the polymer in the core is crosslinked, by monomers containing multifunctional acrylic ester groups. The internal crosslinking is not sufficient to obtain high-grade chemical and mechanical durability. Thus the coatings are not resistant to methyl ethyl ketone (MEK), for example.

Subsequent crosslinking with isocyanate is not described.

If pure hydroxy(meth)acrylate is added as the last monomer component for producing the multiphase structure, in an amount such that the requisite OH content is > 0,5 weight % based on the total polymer, a considerable proportion of granular material is formed even during polymerization, or the batch coagulates during polymerization.

In general, only polymer shells which contain a proportion of hydroxy(meth)acrylate can therefore be produced, although a pure hydroxy(meth)acrylate shell is desirable.

Surprisingly, it has been found that pure hydroxy(meth)acrylate shells can be produced if the aqueous polymerization starting batch contains a neutralized, water-soluble urethane-allyl ether polyester.

The present invention relates to a polymer dispersion comprising an aqueous continuous phase and dispersed particles, which consist of a polymerized, water-soluble, urethane-modified allyl ether polyester and polymerized monomers, characterised in that 1. at least two polymerized monomers A and B together with a water-soluble urethane-modified allyl ether polyester constitute the dispersion particles and are produced according to the core-shell model (multiphase).

2. A is one or more monomers of formula

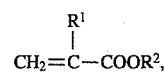

which produces the core with a polymerizable compound containing a double bond, where:

$R^1$ represents a hydrogen atom or an alkyl group with 1 to 4 C atoms, particularly methyl, $R^2$ represents hydrogen, an alkyl radical with 1 to 20 C atoms, a cycloalkyl radical with 5 or 6 carbon atoms, a radical of general formula $-(CHR^3-CHR^4-O)_n-R^5$, or an aryl radical, particularly a phenyl or benzyl radical, $R^3$, $R^4$, $R^5$ represent hydrogen, an alkyl radical with 1–6 C atoms, particularly methyl or ethyl, and n is an integer from 1 to 50.

The $R^2$ radical may itself be further substituted. In a preferred embodiment the substituent $R^2$ is substituted with a sulphoalkyl group; 2-sulphoethyl is a particularly preferred $R^2$ radical.

3. B is a monomer of general formula:

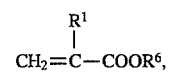

which builds up the shell, where:

$R^6$ represents an alkyl group with 2–6 C atoms which contains at least one OH group, particularly hydroxyethyl and/or hydroxypropyl.

The particles have a diameter less than 10 μm.

Neutralized polyesters, such as those described in DOS 4 011 349, and/or in a combination of DOS 4 011 349 and DE-A 4 219 768, for example, are particularly suitable as water-soluble urethane-modified allyl ether polyesters.

The polymerized water-soluble urethane-modified allyl ether polyester and the polymerized monomers A and B are not uniformly distributed in the polymer particles.

The polymerized monomers B are mainly to be found—homogeneously distributed—in the outer envelope (shell) around the dispersion core.

In the form of implementation according to the invention the ratio of polymerized monomers A of the core to polymerized monomers B of the outer envelope (shell) is 80:20 to 95:5. The core of the polymer particles may also have a plurality of envelopes of different composition.

The dispersion particles according to the invention contain

2–10 weight % of polymerized water-soluble urethane-modified allyl ether polyester,
70–90 weight % of polymerized monomer A,
5–20 weight % of polymerized monomer B, and
0.2–10 weight % of an emulsifying agent C.

The present invention also relates to a method of preparing a dispersion according to the invention, characterised in that the monomers A and B are polymerized in an aqueous phase in the presence of a water-soluble urethane-modified allyl ether polyester and an emulsifying agent C.

The present invention further relates to the use of the dispersion according to the invention, optionally with the addition of the usual lacquer constituents, particularly internal lubricants, gloss promoters, flow promoters, pigments, fillers, resins, plasticizers, and optionally solvents and polyisocyanates for crosslinking.

The polymerizable monomers A may be partially replaced, preferably up to 70 weight % most preferably 5 to 50 weight %, by at least one of the following polymerizable monomers:

1. Styrene and/or substituted styrenes of the following formula:

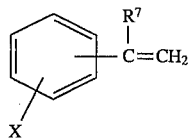

where $R^7$ represents an H or —$CH_3$ radical and X represents a hydrogen or halogen atom (e.g. a chlorine or bromine atom) or a methyl group.
2. Vinyl esters such as vinyl acetate, vinyl propionate and/or butyrate; vinyl acetate is preferred.
3. Vinyl chloride and/or vinylidene chloride.
4. In addition, acrylonitrile, methacrylonitrile or acrylamide may be added.
5. Reaction products of hydroxyethyl acrylate, hydroxypropyl acrylate, hydroxypropyl methacrylate or hydroxyethyl methacrylate with monoisocyanates or epoxides.
6. Compounds containing allyl ether groups and with only one polymerizable double bond.

In addition, the polymerizable monomers A may be partially replaced, preferably up to 10 weight %, by polyfunctional compounds:

Such polyfunctional compounds comprise monomers or prepolymers which contain more than one polymerizable double bond per molecule of monomer or prepolymer, such as epoxy polyacrylates, polyester polyacrylates or polyurethane polyacrylates or the corresponding methacrylates or allyl ether compounds.

Suitable emulsifying agents for aqueous media for the preparation of the dispersion according to the invention are described in "Emulsions: Theory and Practice", Paul Becker, Chapter 6, Reinhold Publishing Corp., New York (1965), in McCutcheon's "Detergents and Emulsifiers, 1972 Annual", and in "Tenside, Textilhilfsmittel, Waschrohstoffe" [*Surfactants, Textile Resources, Detergent Raw Materials*], Dr. K. Lindner, Wissenschaftliche Verlagsgesellschaft, Stuttgart, 1964.

Examples of these include anion-active substances such as carboxylates, e.g. fatty acid soaps (derived from lauric, stearic or oleic acid) and acyl derivatives of sarcosine (methyl glycine), sulphates e.g. sodium lauryl sulphate, sulphated natural oils and esters (Turkish Red Oil) and alkyl aryl polyether sulphates and sulphonates, e.g. alkyl aryl polyether sulphonates, dodecylbenzene sulphonate, isopropyl naphthalene sulphonates and sulphosuccinates, as well as sulphosuccinates, phosphoric acid esters e.g. long-chain fatty alcohol esters of complex phosphates and orthophosphoric acid esters of polyethoxylated fatty alcohols.

In addition, carboxylates, sulphates, sulphonates, phosphates, phosphites or phosphonates of non-ionic, surface-active alkyl, aryl, or alkylglycol ethers, acrylated or alkylated alkanolamine polyglycol ethers or copolymers of ethylene oxide and/or polypropylene oxide may be used.

The above-mentioned anion-active substances may be present in the form of the sodium, potassium, lithium, ammonium or amine salts; the sodium and ammonium salts are most commonly used.

Lauryl ammonium sulphonic acid betaine is an example of an amphoteric substance.

Examples of non-ionic substances include ethoxylated monohydric and polyhydric alcohols (i.e. the ethylene oxide derivatives of these alcohols), such as octyl and nonylphenol derivatives, ethylene oxide/propylene oxide bulk copolymers, esters (e.g. glyceryl monostearate), ethoxylated oils, such as the ethoxylation products of sorbitol (e.g. sorbityl monostearate, polyethylene oxide sorbityl monolaurate) and laurie acid isopropanolamide.

Anion-active and/or non-ionic substances are employed most frequently.

The following substances may also be used (either alone or in combination with the surface-active substances described above): colloids and high molecular weight stabilizers, such as complex polysaccharides (gum arabic and tragacanth), amylopectin, water-soluble cellulose derivatives (e.g. sodium carboxymethyl cellulose, hydroxyethyl and hydroxypropyl cellulose), polyvinyl alcohol (e.g. in partially saponified form), polyvinyl pyrrolidone (e.g. alkylated polyvinyl pyrrolidone), alginates and carrageenan.

There is an extensive literature, including the above-mentioned literature references, which deals with the selection of the correct surface-active agents and stabilizers. It is frequently advised that the selection be made by experiment. Typical amounts added fall in the range of about 0.2 to 10 weight %.

Methods of preparing the aqueous emulsions are generally known and are described, for example, in:

Journal of Polymer Science, Vol. 22, pp. 1365–1372

H. Rauch Puntigam, th. Völker Acryl— und Methacryl-verbindungen [*Acrylic and Methacrylic Compounds*] Springer Verlag—Heidelberg 1967

Ullmann's Encyklopädie der Technischen Chemie, Vol. 19, Verlag Chemie.

The stepwise polymerization procedure to obtain the multiphase (core/shell) structure according to the invention of the polymer particles is effected starting from an aqueous solution of the urethane-modified allyl ether polyester and the successive metered addition, as is known, of different monomer compositions to the same polymerization batch, which is polymerized according to the known emulsion polymerization principle.

The metered addition of OH-containing monomer B is made according to the invention as the last monomer addition.

The addition of the individual monomer compositions is made by the addition method (e.g. from monomer solutions and/or monomer emulsions).

The polymerization reaction requires a radical-forming initiator, which is added as one batch, in portions or continuously. The addition may be made using the substance on its own or in aqueous or organic solution. Individual initiators may be used, or mixtures of initiators may be used, which preferably have different decomposition rates.

Water-soluble and oil-soluble radical-forming compounds are suitable as initiators. Examples of suitable water-soluble compounds include sodium, potassium and ammonium persulphate, tert.-butyl hydroperoxide and hydrogen peroxide.

These may be used by themselves or together with reducing agents such as iron (II) sulphate, sodium sulphite, sodium hydrogen sulphite, sodium thiosulphate or ascorbic acid.

Examples of oil-soluble compounds which can be used include peroxides and hydroperoxides, such as benzoyl peroxide, lauryl peroxide and cyclohexanone hydroperoxide, percarbonates and azo compounds, for example.

The molecular weights of the polymers may be restricted in the usual manner by the addition of chain transfer media and regulators.

Subsequent neutralisation of the polymer dispersion is generally effected using bases, such as caustic soda, ammonia, triethanolamine or methyl diethanolamine, for example.

The viscosity of the aqueous polymer dispersion is preferably in the range 2 to 1000 mPas. The average particle diameter is preferably in the range from 0.01 to 2 μm and is generally monomodal.

The solids content of the polymer dispersion is in the range from 10 to 70 weight %, preferably in the range from 20 to 60 weight %.

Depending on the area of application (e.g. the coating of wooden, metal, plastic, paper, leather, glass, foil and mineral constructional materials) polyisocyanates with free isocyanates are added in emulsified form to these polymer dispersions according to the invention, the NCO/OH equivalent ratio being set at 0.5:1 to 3.1.

The polyisocyanate components are organic polyisocyanates, such as those described in EP 0358979, for example.

If necessary, solvents can be added in a maximum amount of 15 weight % to the polymer dispersion and/or to the polyisocyanate components to adjust the desired minimum film temperature.

Additions can also be made of materials which improve processing or application technology characteristics, such as internal lubricants, gloss promoters, flow promoters, pigments, dyes, matting agents and fillers.

Furthermore the dispersions according to the invention may also be combined with other resins, such as alkyd resins and melamine resins, or with other polymer dispersions.

Other OH-containing polymers, such as water-soluble OH-containing polyesters, may also be combined with the polymer dispersion.

EXAMPLES

Urethane-allyl Ether Polyester A

Example No. 3 from Patent Application DE-A 4 219 768 was reworked and used with the following starting materials for the tests according to the invention:

| | |
|---|---|
| Polyethylene glycol 1500 | 0.03 moles |
| Propane-1,2-diol | 0.55 moles |
| Benzyl alcohol | 0.40 moles |
| Trimethylolpropane | 0.04 moles |
| Trimethylolpropane diallyl ether | 0.60 moles |
| Maleic anhydride | 1.00 moles |
| Acid number (mg KOH/g) of the allyl ether polyester: | 21 mg/g |

This polyester was mixed with 0.35 weight % hexamethylene diisocyanate at 70° C. After 2 hours the mixture was cooled, whereupon no free NCO groups could be determined.

This urethane-allyl ether polyester was taken up in water by means of a dissolver (solids content 50 weight %) and adjusted to pH 7.2 with 12.5% ammonia. This neutralisation procedure produced a slightly cloudy viscous solution.

Example 1

26 g of the sodium salt of alkylphenol ether sulphate, 481 g water and 40 g of neutralized urethane-allyl polyester A were introduced into a 1 liter reaction vessel fitted with a reflux condenser, 2 addition feed inlets and a stirrer, and heated to 72° C.

The following mixtures were prepared:
Addition 1a
  3 g methacrylic acid
  101 g butyl acrylate
  101 g styrene
Addition 1b
  86 g methyl methacrylate
  18 g butyl acrylate
Addition 1c
  30 g hydroxypropyl acrylate
  13 g alkylphenol ether sulphate Na salt
  30 g water
Addition 2
  1.3 g potassium persulphate
  60 g water 8% of the amounts of additions 1a and 2 were introduced over 5 minutes into the reaction starting batch heated to 72° C., and the mixture was maintained at this temperature for 15 minutes.

After this reaction period the remainder of addition 1a was added over 90 minutes and the remainder of addition 2 was added over 400 minutes. After the completion of addition 1a the mixture was heated to 90° C. and addition 1b was introduced uniformly over 40 minutes. After the completion of addition 1b the mixture was stirred for a further 60 minutes at 85° C. and addition 1c was then introduced over 120 minutes. After the completion of addition 2 the mixture was cooled to 25° C. and adjusted to pH 6.8 with ammonia.

The dispersion was free from granular material and had an average particle diameter of 0.3 μm.

Example 2

Example 1 was repeated, without using the neutralized urethane-allyl ether polyester A.

A considerable proportion of coarse granular material was formed in the reaction vessel whilst introducing addition 1 c, so that the final product could no longer be used for the application tests.

Example 3

17 g of the Na salt of alkylphenol ether sulphate, 496 g water and 26 g of neutralized urethane-allyl ether polyester A were introduced into the reaction vessel described in Example 1 and heated to 75° C.

The following mixtures were prepared:
Addition 1a
  3 g methacrylic acid
  78 g butyl acrylate
  66 g styrene
  57 g methyl methacrylate
Addition 1b
  39 g hydroxypropyl acrylate
  17 g alkylphenol ether sulphate Na salt
  60 g water
Addition 2
  0.9 g potassium persulphate
  40 g water.

6% of the amount of addition 1a and 8% of the amount of addition 2 were each introduced into the reaction starting batch at 75° C., and the mixture was held at this temperature for 15 minutes.

After this reaction period the remainder of addition 1a was added over 150 minutes and the remainder of addition 2 was added over 380 minutes.

After addition 1a had been introduced completely, addition 1b was introduced over 150 minutes.

After the completion of addition 2 the mixture was cooled to 25° C. and adjusted to pH 6.5 with ammonia.

The dispersion was free from granular material and had an average particle diameter of 0.3 μm.

Example 4

Example 3 was repeated, without the neutralized urethane-allyl ether polyester A.

A gel was formed on adding addition 1b.

Example 5

In order to demonstrate the particular effect of the neutralized urethane-allyl ether polyester, Example 1 was repeated without addition 1c (Test 5a).

Test 5a was also repeated without this neutralized urethane-allyl ether polyester A (Test 5b).

Both tests were free from granular material and exhibited a minimum film temperature of 43° C.

However, the following differences were ascertained:

|  | Test 5 a | Test 5 b |
| --- | --- | --- |
| König Pendulum hardness (90 μm wet film, dried at 80° C. for 15 minutes) | 135 sec | 94 sec |
| Ease of abrasion | Abrasive paper not clogged | Abrasive paper clogged |

These two tests clearly show that the incorporation of the neutralized urethane-allyl ether polyester A produces a desirable improvement in properties, even for systems which are physically drying systems.

Example 6

100 g of the dispersion from Example 1 were mixed with 5 g of a polyfunctional isocyanate based on hexamethylene isocyanate—containing about 17% NCO—and homogenized by means of a cage stirrer.

After 30 minutes this 2-K lacquer was drawn out on a wooden panel by means of a box-type doctor blade (90/μm wet film). This lacquer film was dried at 65° C. for 10 minutes and then abraded with abrasive paper.

The lacquer application was then repeated once more. After storage for 24 hours the chemical durability was examined (according to DIN 68 861, Part 1):

| 50% ethanol | 1 hour | results negative |
| --- | --- | --- |
| Water | 16 hours | results negative |
| petrol | 2 hours | results negative |
| acetone | 10 sec | slight swelling |
| ethyl/butyl acetate (1:1) | 10 sec | results negative. |

After storage for 48 hours the surface, which had been wiped 10 times with MEK, showed no change.

We claim:

1. A polymer dispersion comprising an aqueous continuous phase and dispersed particles which consist of polymerized, water-soluble, urethane-modified allyl ether polyester and polymerized monomers, at least two polymerized monomers A and B together with a water-soluble urethane-modified allyl ether polyester constituting the dispersed particles and having been produced in a multiphase manner according to the core-shell model, the core comprising a polymer of at least one monomer A of the formula

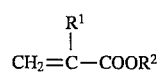

wherein $R^1$ is hydrogen or an alkyl group with 1 to 4 C atoms, $R^2$ is hydrogen, an alkyl radical with 1 to 20 C atoms, a cycloalkyl radical with 5 or 6 carbon atoms, a radical $-(CHR^3--CHR^4-O)_n-R^5$, or an aryl radical with 6 to 8 atoms, $R^3$, $R^4$, $R^5$ each independently is hydrogen, or an alkyl radical with 1 to 6 C atoms, and n is an integer from 1 to 50, the shell comprising a polymer of at least one monomer B of the formula

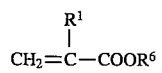

wherein $R^6$ is an alkyl group with 2 to 6 C atoms which contains at least one OH group, the ratio of polymerized monomer in the core to polymerized monomer in the shell ranging from 80:20 to 95:5.

2. A dispersion according to claim 1, wherein A comprises at least about 30% by weight of the core.

3. A dispersion according to claim 1, wherein A comprises about 50% to 95% by weight of the core.

4. A dispersion according to claim 1, wherein the dispersed particles by weight comprise about 2–10% polymerized water-soluble urethane-modified allyl ether polyester, 70–90% core, and 5–20% shell.

5. A dispersion according to claim 4, wherein A comprises about 50 to 95% by weight of the core.

\* \* \* \* \*